(12) United States Patent
Morin et al.

(10) Patent No.: US 8,372,322 B2
(45) Date of Patent: Feb. 12, 2013

(54) PROCESS FOR THE FORMATION OF PORES IN A POLYMER MATRIX

(75) Inventors: Arnaud Morin, Grenoble (FR); Pascal Gentile, Voiron (FR); Nicolas Pauc, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 462 days.

(21) Appl. No.: 12/578,001

(22) Filed: Oct. 13, 2009

(65) Prior Publication Data

US 2010/0098992 A1    Apr. 22, 2010

(30) Foreign Application Priority Data

Oct. 20, 2008 (FR) .................................... 08 05789

(51) Int. Cl.
  *B29C 67/20* (2006.01)
  *C08J 9/26* (2006.01)
  *C08J 7/14* (2006.01)
  *C08J 5/22* (2006.01)
  *H01M 8/00* (2006.01)
(52) U.S. Cl. .......... 264/49; 521/27; 428/315.5; 429/535
(58) Field of Classification Search .... 428/315.5–315.9; 210/500.27–500.43; 521/25–39; 264/49
See application file for complete search history.

(56) References Cited

U.S. PATENT DOCUMENTS

| | | | |
|---|---|---|---|
| 7,931,838 B2 * | 4/2011 | Marand et al. | 264/101 |
| 2006/0263674 A1 * | 11/2006 | Hosoya et al. | 429/44 |

FOREIGN PATENT DOCUMENTS

| | | |
|---|---|---|
| CN | 101 237 059 | 8/2008 |
| JP | 2005 285496 | 10/2005 |
| WO | WO 01/70873 | 9/2001 |
| WO | WO 03/058734 | 7/2003 |
| WO | WO 2006/062947 | 6/2006 |
| WO | WO 2007/119349 | 10/2007 |

OTHER PUBLICATIONS

Asano N et al: "Hydrolytically Stable Polyimide Ionomer for Fuel Cell Applications"; Chemistry of Materials, vol. 16, No. 15; Jul. 27, 2004; pp. 2841-2843.*
JP 2005-285496 JPO Machine Translation, Retrieved Feb. 3, 2012.*
International Search Report from French Application No. 08 05789, filed Sep. 20, 2008.
Koukharenko E et al: "Towards a nanostructured thermoelectric generator using ion-track lithography"; Journal of Micromechanics & Microengineering, Institute of Physics Publishing, Bristol, GB; vol. 18, No. 10; Oct. 1, 2008; pp. 1-9; XP020144998.

(Continued)

*Primary Examiner* — Barbara Gilliam
*Assistant Examiner* — Robert S Carrico
(74) *Attorney, Agent, or Firm* — Alston & Bird LLP (57) ABSTRACT

The invention relates to a process for the formation of pores of controlled shape, dimensions and distribution in a polymer matrix comprising a step of embedding silicon nanowires and/or nanotrees in a nonpolymerized polymer matrix or a nonpolymerized polymer matrix in suspension or in solution in at least one solvent, a step of curing the polymer matrix, and a step of removing the silicon nanowires and/or nanotrees by chemical treatment. The process of the invention can be used for the manufacture of a proton exchange membrane fuel cell active layer. The invention has applications in the field of manufacture of proton exchange membrane fuel cells, in particular.

9 Claims, 4 Drawing Sheets

OTHER PUBLICATIONS

Gentile P et al: "The growth of smalldiameter silicon nanowires to nanotrees"; Nanotechnology 20080326 Institute of Physics Publishing; Dirac House GB; vol. 19, No. 12; Mar. 26, 2008; XP002522636.

Woong Kim and Al: "Fabrication of a porous polyimide membrane using a silicon nanowire array as a template"; Material Letters, vol. 63; 2009; pp. 933-936; XP002527532.

* cited by examiner

PROCESS FOR THE FORMATION OF PORES IN A POLYMER MATRIX

CROSS-REFERENCE TO RELATED APPLICATIONS

This application claims priority from French Application No. 08 05789, filed Oct. 20, 2008, which is hereby incorporated herein in its entirety by reference.

FIELD AND BACKGROUND OF THE INVENTION

The invention relates to a process for the formation of pores of controlled shape, dimensions and distribution in a polymer matrix. It also relates to a proton exchange membrane fuel cell.

The formation of pores of controlled shape, dimensions and distribution in a polymer matrix is important in a large number of applications, such as those employing electrochemical devices (sensor, battery, and the like) or any system requiring a porous material, such as filters.

In particular, it is important in the manufacture of the active layers of a proton exchange membrane fuel cell.

The active layers of proton exchange membrane fuel cells are the site of electrochemical reactions, that is to say of oxidation of hydrogen (for the anode) and of reduction of oxygen (for the cathode), which result in the production of water. These reactions take place in regions where a catalyst, which makes possible the acceleration of the reaction kinetics, an electron conductor, for collecting the electrons, a proton conductor and the gaseous reactants coexist.

The active layer is thus a composite material which has to be:
  proton conducting, in order to make possible the transportation of the protons from the membrane to the reactive sites,
  electron conducting, in order to make possible the transportation of the electrons from the reactive sites to the current collectors,
  porous, in order to make possible:
  a. access of the gases from the monopolar plates to the reactive sites,
  b. evacuation of the water from the reactive sites to the monopolar plates.

The active layers are the site of coupling of the phenomena of transportation of electrons, protons, gases and liquid water.

In an active layer, the electroactive surface area has to be as great as possible for a given geometric surface area and a given catalyst loading in order to obtain the most advantageous performance.

Currently, the catalyst employed is generally platinum and is provided in the form of spherical particles, the diameter of which is of the order of a few nanometers in order to increase the catalytic surface area as much as possible for a given weight of platinum. These catalyst particles are deposited on carbon particles, the diameter of which is of the order of a few tens of nanometers (from 20 to 80 nm inclusive), which can exist in the form of agglomerates. The catalyst can also be in the form of a plan or structured film. The combined product is generally known as "platinized carbon" or "Pt/C". This conducting substrate was chosen due to its chemical stability and its cost. The proton conductor is an ionomer, that is to say a polymer electrolyte (for example of perfluorosulfonated type). Mixing these components results in a porous structure.

Usually, the active layers are prepared in two different ways:

the ionomer and the platinized carbon are suspended in solvents. This suspension, known as ink, is subsequently deposited on the membrane or on the diffusion layer in order to form the active layers after evaporation of the solvents. The structure obtained is porous.

the ionomer is impregnated (for example by spraying) on a premanufactured porous layer comprising the platinized carbon and a polymer binder which is not a proton conductor.

From a structural viewpoint, in these active layers, the ionomer covers the particles of platinized carbon. Consequently, the gases have to pass through the ionomer before reaching the reactive sites. This has the consequence of limiting the access of the gases to the catalytic sites and thus of reducing the performance of the cell.

Furthermore, the distribution of the ionomer and of the platinum is poorly controlled and can result in poor use of the catalyst.

Finally, it is difficult to control the structure of the active layer (diameter of the pores, distribution, electroactive surface area) and thus of the electroactive surface with these manufacturing methods, which are imposed by the nature of the catalyst employed.

SUMMARY OF THE INVENTION

In this context, the invention provides a process for the formation of pores of controlled shape, dimensions and distribution in a polymer matrix which, when applied in particular to the manufacture of active layers of a proton exchange membrane fuel cell, makes it possible to obtain an active layer in which the gases do not have to pass through the ionomer in order to reach the reactive surface of the catalyst.

To this end, the invention provides a process for the formation of pores of controlled shape, dimensions and distribution in a polymer matrix, which comprises:
  a step of embedding silicon nanowires and/or nanotrees in the nonpolymerized polymer matrix or the nonpolymerized polymer matrix in suspension or in solution in at least one solvent,
  a step of curing the polymer matrix, and
  a step of removing the silicon nanowires and/or nanotrees by chemical treatment.

In a preferred embodiment of the invention, the polymer matrix comprises at least one ionomer.

Most preferably, the polymer matrix is composed of an ionomer.

More specifically, and preferably, the ionomer is a perfluorosulfonated polymer.

The process for the formation of pores in a polymer matrix can comprise the step of growing the silicon nanowires and/or nanotrees, which is carried out on a support, the support then being withdrawn between the step of curing the polymer matrix and the step of removing the silicon nanowires and/or nanotrees by chemical treatment.

The invention also provides a process for the manufacture of a proton exchange membrane fuel cell active layer, which comprises:
  a) a step of formation of pores of controlled shape, dimensions and distribution in a polymer matrix by the process according to the invention, in which the polymer matrix comprises or, preferably, is composed of an ionomer, and
  b) a step of deposition of at least one catalyst in the pores formed.

The invention also provides a process for the manufacture of a proton exchange membrane fuel cell active layer, which comprises:

a) a step of formation of pores of controlled shape, dimensions and distribution in a polymer matrix according to the process of the invention, in which the polymer matrix comprises or, preferably, is composed of an ionomer, and b) a step of deposition of at least one catalyst on the nanowires and/or nanotrees before the step of coating these nanowires and/or nanotrees in the polymer matrix.

The invention further provides a proton exchange membrane fuel cell active layer of the type comprising at least one catalyst coated in a polymer matrix, which comprises open pores, the internal walls of which are covered with at least one catalyst, the catalyst not being entirely covered with polymer matrix.

Finally, the invention provides a proton exchange membrane fuel cell, which comprises an active layer according to the invention or obtained by the process for the manufacture of an active layer according to the invention.

BRIEF DESCRIPTION OF THE DRAWINGS

A better understanding of the invention will be obtained and other advantages and characteristics of the invention will become more clearly apparent on reading the explanatory description which follows and which is made with reference to the figures, in which.

MORE DETAILED DESCRIPTION

Figure 1:
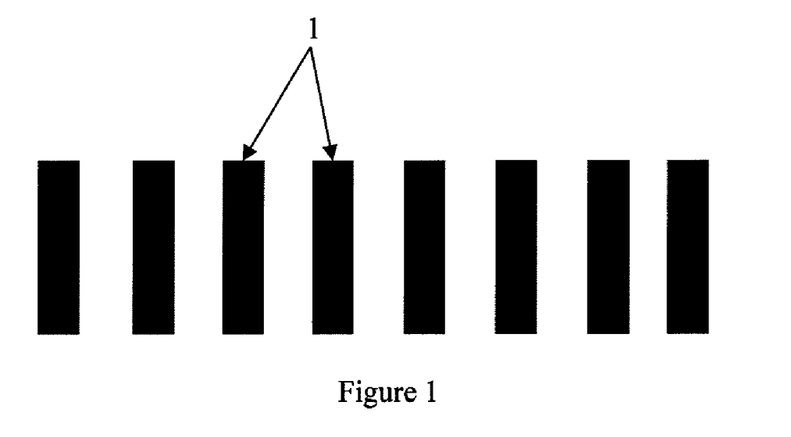
FIG. 1 schematically represents silicon nanowires.
Figure 2:
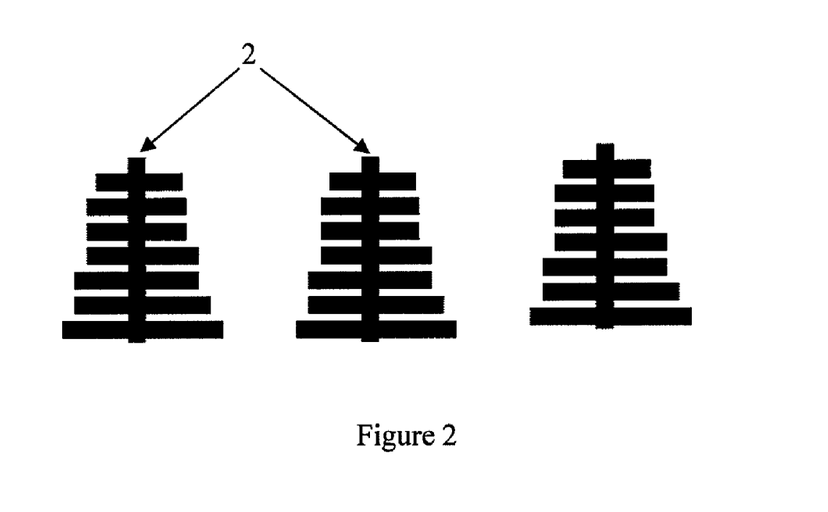
FIG. 2 schematically represents silicon nanotrees.

In the present description and in the claims:

the terms "nanowires" denote wires having at least one dimension of less than 100 nm, such as those represented in FIG. 1, where they are denoted 1, the terms "nanotrees" represent branched structures, such as those represented in FIG. 2, where they are denoted 2, each branch of which has at least one dimension of less than 100 nm, the term "curing" refers both to the polymerization of a polymer matrix, whatever the type of polymerization involved, that is to say whether it is a thermal polymerization, a photopolymerization or a chemical polymerization, and to the curing by evaporation of the solvent or solvents in which the nonpolymerized polymer matrix has been suspended or dissolved, the terms "nonpolymerized polymer matrix" refer to an uncured polymer matrix or an uncured polymer matrix in suspension or in solution in one or more solvents. It can be a solution or a suspension with a very low viscosity or also with a higher viscosity, the important point being that the viscosity of the uncured polymer matrix can allow it to be poured, vaporized, and the like, over a support, the term "ionomer" denotes, in a known way, a polymer electrolyte having ionic conduction properties.

The invention is based on the use of silicon-based structures as "lost" mold, that is to say a mold which will be removed at the end of the process, for the formation of pores of controlled shape, dimensions and distribution.

These silicon-based structures are formed from silicon nanowires and/or nanotrees.

The pores can thus be linear, when they are prepared from nanowires, or branched, when they are prepared from branched silicon structures, or can form a mixed structure of linear pores and branched pores.

Thus, the process for the formation of pores of controlled shape, dimensions and distribution in a polymer matrix according to the invention comprises a step of embedding silicon nanowires and/or nanotrees in an uncured (nonpolymerized) polymer matrix or an uncured (nonpolymerized) polymer matrix in suspension or in solution in at least one solvent. The polymer matrix is then cured and the silicon nanowires and/or nanotrees are removed by chemical treatment.

Advantageously, the process for the formation of pores in a polymer matrix of the invention comprises, before the step of embedding the silicon nanowires and/or nanotrees, a step of growing these nanowires and/or nanotrees.

Preferably, this growing step is carried out on a support which will not itself be coated in the polymer matrix.

However, it will be clearly apparent to a person skilled in the art that the process for the formation of pores of the invention can be carried out with preformed silicon nanowires and/or nanotrees.

The process of the invention makes it possible, after withdrawing the support and removing the silicon nanowires and/or nanotrees, to obtain a structure having open pores.

Generally, the polymer matrix will also be chosen for its ability to withstand the various steps of manufacture of the pores.

In a preferred embodiment of the invention, the polymer matrix comprises an ionomer. It is preferably composed of an ionomer, such as a perfluorosulfonated polymer, for example Nafion®.

This is because, in this case, it is possible to manufacture active layers for proton exchange membrane fuel cells by depositing at least one catalyst in the pores.

The deposition of this at least one catalyst, preferably platinum, can be carried out in two different ways.

The first way consists in depositing the platinum on the silicon nanowires and/or nanotrees before they are embedded with the polymer matrix.

After the removal of the silicon nanowires and/or nanotrees, the catalyst will remain on the walls and at the bottom of the pores thus formed in the polymer matrix. The catalyst will not be entirely covered with polymer matrix, contrary to what took place in the prior art.

However, the deposition of the catalyst in the pores can be carried out after the formation of the pores, that is to say after the removal of the silicon nanowires and/or nanotrees. Here again, the catalyst is not completely covered with polymer matrix.

The proton exchange membrane fuel cell active layer obtained by the process of the invention has only open pores and solely open pores, which had never been obtained, to the knowledge of the Applicant, before the invention.

This structure having solely open pores exhibits numerous advantages.

First of all, the catalyst can be introduced after the formation of the pores.

However, in particular, reactive gases do not have to pass through the ionomer in order to arrive at the catalytic sites, in contrast to the structures of the prior art: the gases pass through the porous structure up to the catalyst, on which the exchanges can take place up to the ionomer via the surface of the catalyst over distances of at most approximately 1 nanometer. The electrons are collected up to the surface of the membrane by an electron conductive layer which can be a catalyst.

This is because, with the process of the invention, the catalyst is not entirely coated in the polymer matrix; a large part of its surface is free. This was not obtained with the processes of the prior art, where the catalyst was "coated" in the porous polymer matrix, which thus covered most of its active surface.

Furthermore, the water can be preferably evacuated via the part of the surface of the active layer composed of ionomer and interferes less with the streams of reactants occurring in the opposite direction.

Such a structure having open pores makes possible better use of the catalyst, that is to say a better performance, for the same amount by weight of catalyst.

The catalyst can be deposited in the form of particles or in the form of a flat or structured film.

Thus, the fuel cells comprising membranes comprising such active layers are also a subject matter of the invention.

In order to make the invention better understood, a description will now be given, as purely illustrative and nonlimiting examples, of several embodiments.

EXAMPLE 1

Manufacture of an assembly having two active layers for a proton exchange membrane fuel cell comprising the growth of silicon structures.

This example will be described with reference to FIGS. 3 to 8.

Figure 3:
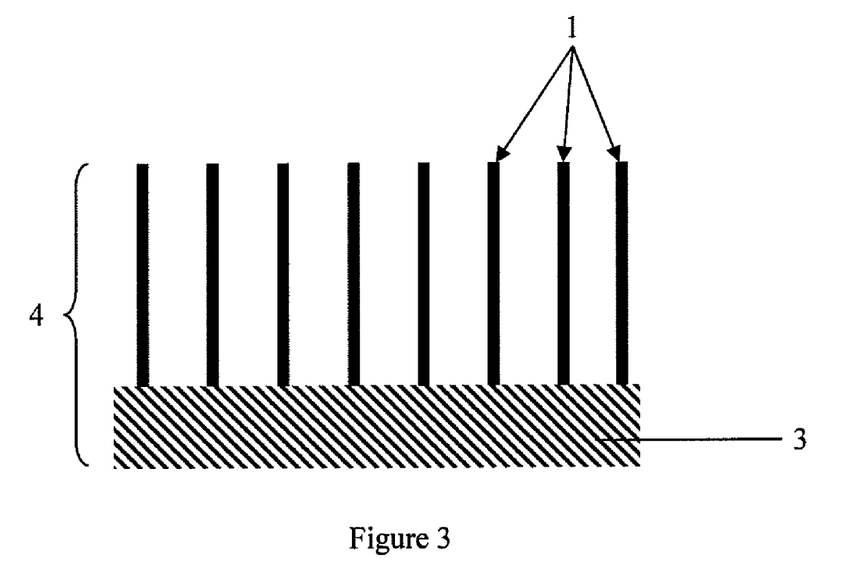
FIG. 3 schematically represents silicon nanowires after the growth thereof on a support, FIG. 4 schematically represents silicon nanowires bonded to their support and covered with catalyst particles, FIG. 5 schematically represents silicon nanowires bonded to their support and covered with catalyst particles, coated in a polymer matrix composed of an ionomer.

1) Step 1:

In the first step, the silicon structures, in this instance structures comprising nanowires, denoted 1 in FIG. 3, are grown on a support, denoted 3 in FIG. 3.

The support 3 can be a metal, an oxide or a semiconductor material. In this example, a support made of silicon is used. The silicon can also be n-doped or p-doped silicon, of <100>, <111> or <110> type.

A supported structure, denoted 4 in FIG. 3, is obtained.

This structure formed of silicon nanowires 4 is grown, for example, as described in P. Gentile et al., Nanotechnologie, 19 (2008), page 125608.

More generally, the growth of the structures of these silicon nanowires is carried out using a source of material which can be either silicon particles which have been subjected to laser ablation or a reactive gas, such as silane.

This source of material subsequently reacts with a catalyst which brings about the growth of the nanowires. The catalysts used for the growth of the nanowires, and which have the best yields, are usually metal catalysts provided either in the liquid form (colloidal solutions) or in the solid form (nanoaggregates). These metal catalysts can be deposited in several ways, for example by simple deposition of droplets of colloidal solution or by thermal dewetting of a self-assembled thin film deposited beforehand on the support.

The catalyst most commonly used is gold but other metals have been mentioned in the literature, such as copper, titanium, platinum, silver, palladium and nickel. It is the diameter of the catalyst which determines and fixes the diameter of the silicon nanowires obtained.

The growth mechanism takes place as follows.

First of all, the reactive gas creates a continuous supply of material in the catalyst aggregate, which then experiences a change in its composition until it is supersaturated with the decomposition product from the reactive gas (silicon for silane, germanium for germane, and the like). When supersaturation is acquired, the continuous supply of material originating from the reactive gas source is deposited and grows, by precipitation, in the form of a column of solid material, generally crystalline, at the base of the catalyst. The final form of the deposited material is thus a solid and strong nanowire capped by a catalyst aggregate at its active end. The length of the wire can be adjusted by varying the time of exposure to the reactive gas. An example of a typical process for the manufacture of nanowires with a diameter of 5 to 20 nm, by the VLS (Vapor-Liquid-Solid) method in a chemical vapor deposition (CVD) reactor, is described below:

a) Preparation of the support: silicon <111>, cleaning in a bath of acetone and then isopropyl alcohol, followed by deoxidation of the surface by dipping for 2 min in $HF/NH_4F$.

b) Deposition of the catalyst: gold colloid with a diameter of 5 to 20 nm, dipping of the support in the colloidal solution or by electrodeposition.

c) The support is introduced into the CVD (Chemical Vapor Deposition) reactor and then heated with a rise in temperature to 550° C. under a stream of hydrogen of 4 l/min at 20 mbar.

d) Growth of the nanowires: introduction of silane at 50 $cm^3/s$ at 550° C. with 4 l/min of $H_2$ and 20 mbar of pressure. All other conditions remaining unchanged, the length of the nanowires will be fixed by the duration of the deposition.

e) Stopping the growth: stopping the silane and cooling under a stream of $H_2$.

f) In the end, the catalyst occurring at the top of the nanowires can be removed chemically: dipping of the support in a solution for attacking the catalyzing metal: for example, potassium iodide for gold.

Figure 4:
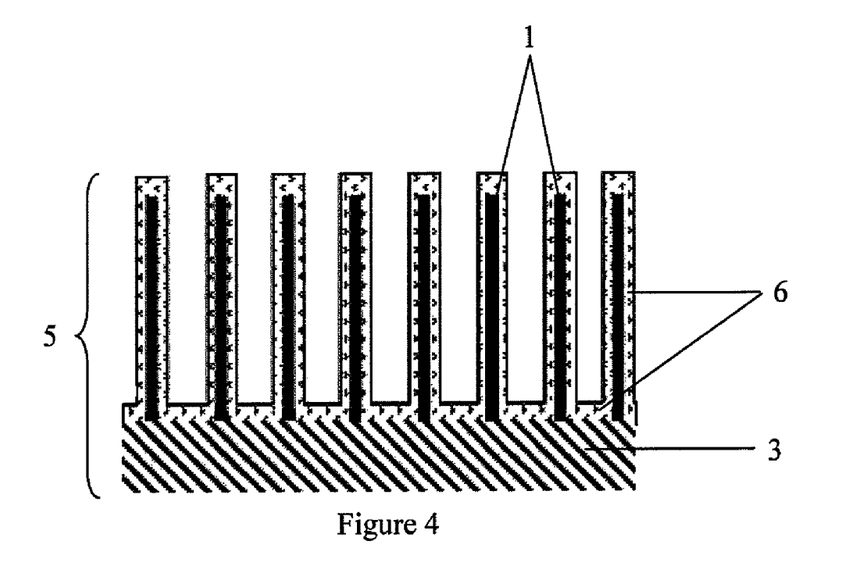

2) Step 2:

The second step of the process for the manufacture of an assembly comprising two active layers according to the invention consists in depositing the catalyst, by chemical vapor deposition, by plasma-assisted chemical vapor deposition or by the chemical route of the catalyst, denoted 6 in FIG. 4, in this instance platinum, on the surface of the silicon nanowires.

Nonplanar surfaces, such as those of the nanowires, are covered by these well-known deposition methods. When the deposited catalyst material is not a good electron conductor, it is necessary, before carrying out the deposition of this catalyst, to deposit beforehand a thin layer of electron conductor at the surface of the silicon nanowires. This deposition takes place by means of the same deposition methods as those for the catalyst. A supported structure, denoted 5 in FIG. 4, which is electron conducting and catalyzed is thus obtained.

3) Step 3:

The third step of the process for the manufacture of an assembly comprising two active layers according to the invention is the deposition of the ionomer by pouring or spraying from a solution or a suspension in a mixture of solvents. The ionomer used in this example is Nafion®, denoted 7 in FIG. 5.

4) Step 4:

The fourth step of the process for the manufacture of an assembly comprising two active layers according to the invention consists in evaporating the solvents from the solution of the polymer electrolyte 7 in suspension, optionally by heat treatment. The active layer, denoted 8 in FIG. 5, composed of the silicon nanowires 1 bonded to their support 3, covered with platinum particles 6 and embedded in Nafion®, is then obtained.

Figure 5:
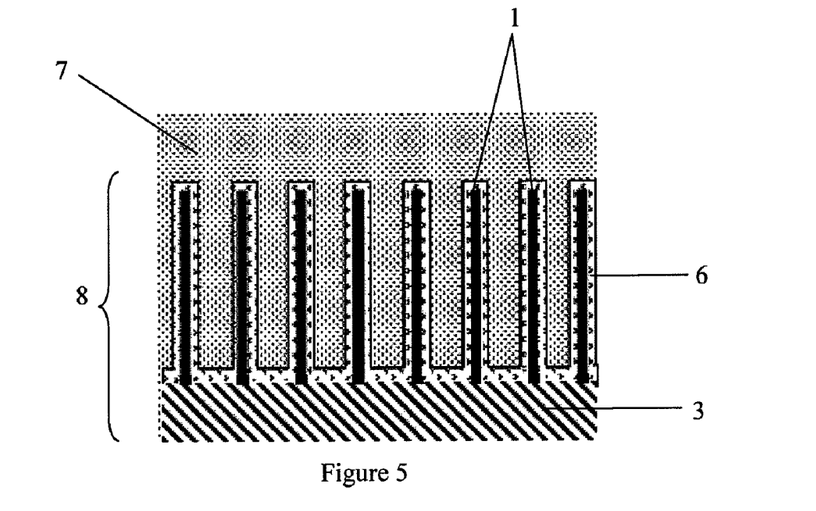
Figure 6:
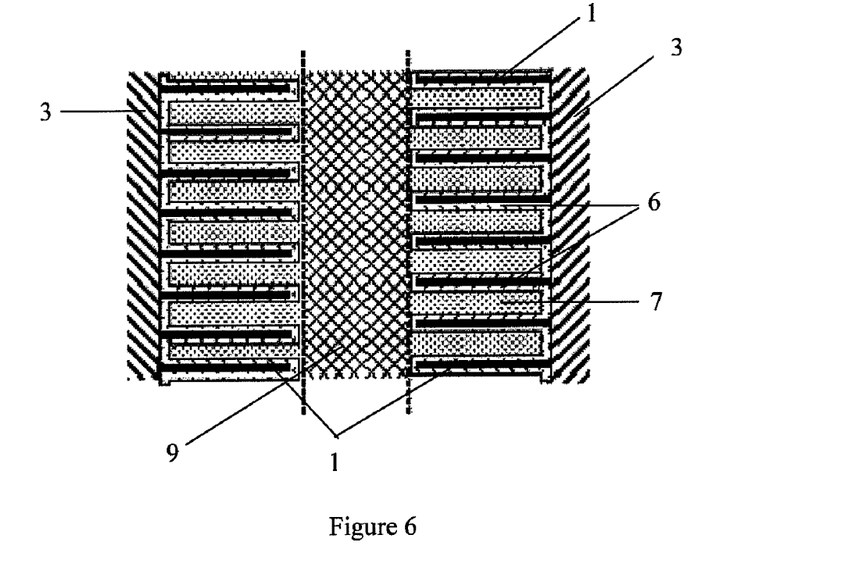
FIG. 6 represents a three-layer assembly composed of two active layers according to FIG. 5 separated by a proton conductive membrane.

5) Step 5:

The fifth step of the process for the manufacture of an assembly comprising two active layers according to the invention consists in assembling, by hot pressing or by adhesive bonding, two supported active layers, such as those represented in FIG. 5, and the proton conductive membrane, denoted 9 in FIG. 6.

The conductive membrane can be made of a perfluorosulfonated polymer, such as Nafion® or Hyflon®. However, it can also be made of another conducting polymer, such as a cation conducting polymer, for fuel cells.

The exchange membrane assembly comprising three layers shown in FIG. 6, composed of two active layers as represented in FIG. 5 separated by the membrane 9, is obtained.

Figure 7:
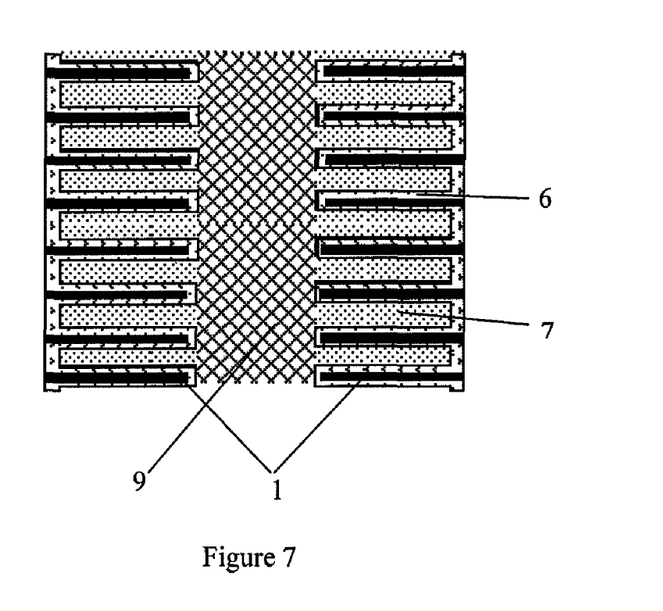
FIG. 7 represents the three-layer assembly having open porosity of FIG. 6 after withdrawal of the supports from each active layer.

6) Step 6:

The sixth step of the process for the manufacture of an assembly comprising two active layers according to the invention consists in withdrawing the supports 3 by immersion in water or by mechanical action in order to obtain the exchange membrane assembly comprising three layers represented in FIG. 7 and composed of the two nanowire structures, without their support, embedded in the ionomer Nafion® and separated by the membrane 9.

Figure 8:
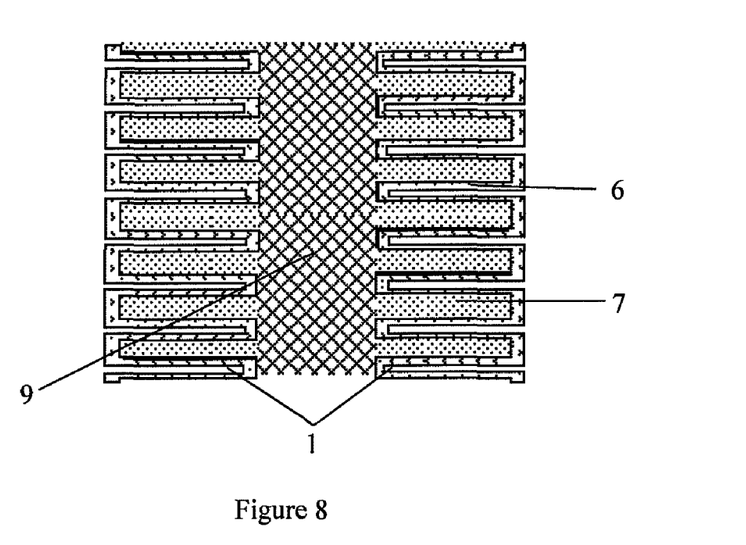
FIG. 8 represents the three-layer assembly according to the invention, in which each active layer has an open porosity, obtained after removing the nanowires in the three-layer assembly represented in FIG. 7.

7) Step 7:

The seventh step of the process for the manufacture of an assembly comprising two active layers according to the invention consists in removing the silicon nanostructures 1 by chemical treatment.

Several methods can be used for this removal:
dipping in a bath of potassium hydroxide (KOH), at 25% by weight in water, at 80° C., optionally diluted in isopropyl alcohol,
dipping in a mixture of 48% hydrofluoric acid HF, 70% nitric acid $HNO_3$, deionized water and acetic acid $CH_3COOH$,
dipping in a mixture of 48% HF, 70% $HNO_3$ and $CH_3COOH$ or
dipping in a bath of TMAH (TetraMethylAmmonium Hydroxide) at 25% by weight in water at 80° C.

In the case of the use of a bath of KOH or of a bath of a TMAH solution, and if the removal of the silicon structure takes place several hours after the withdrawal of its support, a deoxidation of the base of the silicon wires is necessary.

For this, use may be made of dipping in a bath of a buffered oxide etch, known as "BOE", solution composed of approximately 10% of HF, or dipping in a bath of 48% HF or dilute HF (down to 1%).

When use has already been made of a 48% HF mixture, deoxidation is not necessary.

The assembly obtained is then, after removal of the silicon nanowire structure, the proton exchange membrane. It is rinsed with water. It is a membrane with active layers comprising open pores.

Subsequently, in order to replace the cations originating from the chemical treatment with protons, the assembly obtained is immersed in 1M sulfuric acid or 30% by weight nitric acid diluted in water at 80° C. for one hour.

Finally, the assembly is rinsed in deionized water.

EXAMPLE 2

Manufacture of a proton exchange membrane comprising just one active layer.

The same steps 1 to 4 are carried out as in example 1 but, in the fifth step, just one active layer is assembled with the proton conductive membrane.

Steps 6 and 7 are subsequently carried out.

EXAMPLE 3

Manufacture of a proton exchange membrane assembly comprising two active layers.

The procedure is as in example 1, except that use is made of silicon nanowire structures already prepared.

The silicon nanowires used can be n-doped or p-doped in order to make possible the deposition of catalyst by electrodeposition. This doping takes place during the growth by the combined use of silane or dichlorosilane and a precursor gas of the doping agent. The doping gas can be phosphine, in order to obtain n-doped silicon nanowires. Diborane can be used in order to obtain p-doped silicon nanowires.

EXAMPLE 4

Manufacture of a proton exchange membrane assembly.

The procedure is as in example 1, except that the second step of deposition of the catalyst is not carried out immediately after the growth of the nanowires but after the step of removal of these nanowires. Deposition of the catalyst can be carried out by CVD.

EXAMPLE 5

The procedure is as in example 1, except that silicon nanotrees are grown. This is carried out as described in Gentile et al., Nanotechnologie, 19 (2008), page 125608.

Although, in the preceding examples, the manufacture of a proton exchange membrane assembly has been described, it will be clearly apparent to a person skilled in the art that steps 1 to 4 and 6 to 7 correspond to the manufacture of an active layer itself.

In the same way, although the invention has been described in the preceding examples with reference to proton exchange membranes, it will be clearly apparent to a person skilled in the art that the process for the manufacture of the active layers as described above can be used to form pores of controlled size, dimensions and distribution in any polymer matrix, without addition of catalysts.

What is claimed is:

1. A process for the formation of pores of controlled shape, dimensions and distribution in a polymer matrix, which comprises:
   a step of embedding silicon nanowires and/or nanotrees in the nonpolymerized polymer matrix or the nonpolymerized polymer matrix in suspension or in solution in at least one solvent,
   a step of curing the polymer matrix, and a step of removing the silicon nanowires and/or nanotrees by chemical treatment, thereby forming pores of controlled shape, dimensions and distribution in the polymer matrix.

2. The process as claimed in claim 1, wherein the polymer matrix comprises at least one ionomer.

3. The process as claimed in claim 1, wherein the polymer matrix is composed of an ionomer.

4. The process as claimed in claim 2, wherein the ionomer is a perfluorosulfonated polymer.

5. The process as claimed in claim 4, which additionally comprises a step of growing the silicon nanowires and/or nanotrees carried out on a support which is withdrawn between the step of curing the polymer matrix and the step of removing the silicon nanowires and/or nanotrees by chemical treatment.

6. A process for the manufacture of a proton exchange membrane fuel cell active layer, which comprises a step a) of formation of pores of controlled shape, dimensions and distribution in a polymer matrix by the process as claimed in claim 2 and a step b) of deposition of at least one catalyst in the pores thus formed.

7. A process for the manufacture of a proton exchange membrane fuel cell active layer, which comprises a step a) of formation of pores of controlled shape, dimensions and distribution in a polymer matrix by the process as claimed in claim 2 and a step b) of deposition of at least one catalyst on the silicon nanowires and/or nanotrees before the step of embedding these silicon nanowires and/or nanotrees in the nonpolymerized polymer matrix or the nonpolymerized polymer matrix in suspension or in solution in at least one solvent.

8. A process for the manufacture of a proton exchange membrane fuel cell active layer, which comprises a step a) of formation of pores of controlled shape, dimensions and distribution in a polymer matrix by the process as claimed in claim 4 and a step b) of deposition of at least one catalyst on the silicon nanowires and/or nanotrees before the step of embedding these silicon nanowires and/or nanotrees in the nonpolymerized polymer matrix or the nonpolymerized polymer matrix in suspension or in solution in at least one solvent.

9. A process for the manufacture of a proton exchange membrane fuel cell active layer, which comprises a step a) of foiniation of pores of controlled shape, dimensions and distribution in a polymer matrix by the process as claimed in claim 5 and a step b) of deposition of at least one catalyst on the silicon nanowires and/or nanotrees before the step of embedding these silicon nanowires and/or nanotrees in the nonpolymerized polymer matrix or the nonpolymerized polymer matrix in suspension or in solution in at least one solvent.

* * * * *

UNITED STATES PATENT AND TRADEMARK OFFICE
CERTIFICATE OF CORRECTION

PATENT NO. : 8,372,322 B2
APPLICATION NO. : 12/578001
DATED : February 12, 2013
INVENTOR(S) : Morin et al.

Page 1 of 1

It is certified that error appears in the above-identified patent and that said Letters Patent is hereby corrected as shown below:

In the Claims:

Column 10,
Line 18, "foiniation" should read --formation--.

Signed and Sealed this
Seventh Day of May, 2013

Teresa Stanek Rea
*Acting Director of the United States Patent and Trademark Office*